INVENTORS
Willis A. Potter
Richard L. Alexander
BY
ATTORNEY

United States Patent Office 3,574,806
Patented Apr. 13, 1971

3,574,806
METHOD FOR PRODUCING FLATTENED SHEETING OR FLATTENED TUBING OF MOLTEN THERMOPLASTIC RESINS CIRCUMFERENTIAL CHILL CASTING
Willis A. Potter, Orange, Tex., and Richard L. Alexander, Greensburg, Ind., assignors to Gulf Oil Corporation, Pittsburgh, Pa.
Filed Sept. 7, 1967, Ser. No. 666,092
Int. Cl. B29c 17/07
U.S. Cl. 264—89
5 Claims

ABSTRACT OF THE DISCLOSURE

Method for producing polymer film by extruding a polymer from a radial die to form film tubing, cooling the extruded polymer film tubing over an arcuate, shoulder-shaped heated mandrel while the polymer film tubing is supported by a thin layer of moving air, then further cooling the polymer film tubing by contacting the tubing with a cooled porous mandrel which has internal vacuum to create intimate contact, then slitting the tubing, blowing air into the opening caused by the slit, and causing the slit tubing to lay flat with a wedge-shaped tubing opener, then finally winding up the flat sheet into rolls.

BACKGROUND OF THE INVENTION

This invention relates to a method for the production of thermoplastic tubing and sheeting and, more particularly, to a method for producing thin-walled, continuous, seamless tubing and sheeting. The invention is particularly useful to produce film from polymers of non-aromatic or aliphatic hydrocarbon olefins, such as polyethylene and polypropylene, but is not so limited. It is advantageous to orient freshly extruded film simultaneously with its extrusion by stretching it uniformly in directions both parallel and normal to the die face. One technique for accomplishing such orientation utilizes the distending effect of a trapped pocket or bubble of gas which is enveloped under pressure within tubular film as the tubing is initially formed. This process is known as a "trapped bubble" process. However, the rate at which film and sheeting can be produced in the "trapped bubble" process is limited by the rate at which the blown tubing can be coiled. Also the optical properties of the blown film are sometimes less than desirable.

SUMMARY OF THE INVENTION

The process of this invention can be described beginning with a molten extrudate emitting from a radial die at the head of an extruder and immediately being cooled to form a film tubing by passing over a heated, arcuate, shoulder-shaped mandrel which is mounted in a position centered on the radial die. A thin layer of moving air or other fluid at low pressure is introduced between the film tubing and the heated mandrel to prevent sticking of the molten polymer film. Temperatures of the polymer and the heated mandrel are variably controlled to optimize the bi-axial orientation and quenching of the film tubing. The film tubing then intimately contacts a cylindrical mandrel cooled directly in line with the heated mandrel. This mandrel is highly refrigerated, and is fabricated from a porous metal such as sintered bronze or porous aluminum as is commonly used for mold construction in the vacuum forming industry. A partial vacuum inside this mandrel draws the film tubing into intimate contact and provides a high rate of heat transfer enabling greater process rates and economics. This cooled porous cylindrical mandrel also provides more accurate tubing sizing. The cooled tube may then be partially collapsed and slit in line with the mandrel. After the slitting, the film may pass over and around a wedge-shaped opener which functions to change the film shape from a tube to flat sheeting. A fan positioned at the opening may direct a flow of air into the opener in such a manner as to provide a slight static pressure inside the tubing for bubble support and wrinkle free collapsing and slitting. Flat sheeting thus produced may be directed by an idler roll and then wound into rolls. This improved process has the following advantages: improved processing productivity rates, no edge trim or scrap as is normally associated with tubular sheeting; and vast savings in equipment cost because there are no nip rolls, drive for nip rolls, or controls for nip rolls; there is no center stand; there is only one film winder; and the large tubular dies required for wide sheeting production are not necessary, since the whole uncreased tube is formed out to a flat sheet, for example, 63-inch wide sheeting can be made from a 10-inch die at 2 to 1 blow-up.

The flat tubing or sheeting prepared by the method of this invention is useful for packaging in the same manner as the conventional polymer films.

BRIEF DESCRIPTION OF THE DRAWING

With reference to FIG. 1, molten thermoplastic resin is extruded from extruder 1 through radial die 2. Radial die 2 may be rotated by rotator 12 in the conventional manner. The freshly extruded film tubing 3 is first cooled by heated mandrel 4 containing heat transfer coils 5. The film tubing is then cooled to a temperature beneath the thermoplastic temperature of the polymer resins by cooled mandrel 6 also containing heat transfer coils 5. The extruded film tubing 3 is held in intimate contact with cooled mandrel 6 by means of a vacuum applied internally to cooled mandrel 6 through vacuum line 7 in the extruder head. Cooled mandrel 6 is porous metal. Cooling fluid is communicated to heat transfer coils 5 in cooled mandrel 6 through line 8 in the extruder head. Air line 9 and heating fluid line 10 communicate to heated mandrel 4 through the extruder head. Heating fluid flows through heat transfer coils 5 in heated mandrel 4 and air exits heated mandrel 4 through a ring-shaped opening 11 in heated mandrel 4 just at radial die 2 to provide a thin layer of moving air between heated mandrel 4 and freshly extruded film tubing 3. After cooling, the film tubing 3 is partially collapsed by collapser 13 and slit open by tube slitter 14 then laid flat by tube opener 15. Fan 16 blows air into the opened tube against tube opener 15 to maintain partial pressure in film tubing 3. Flat sheeting 17 rolls across idler roll 18 to winder 19 where it is wound into rolls.

Figure 1:
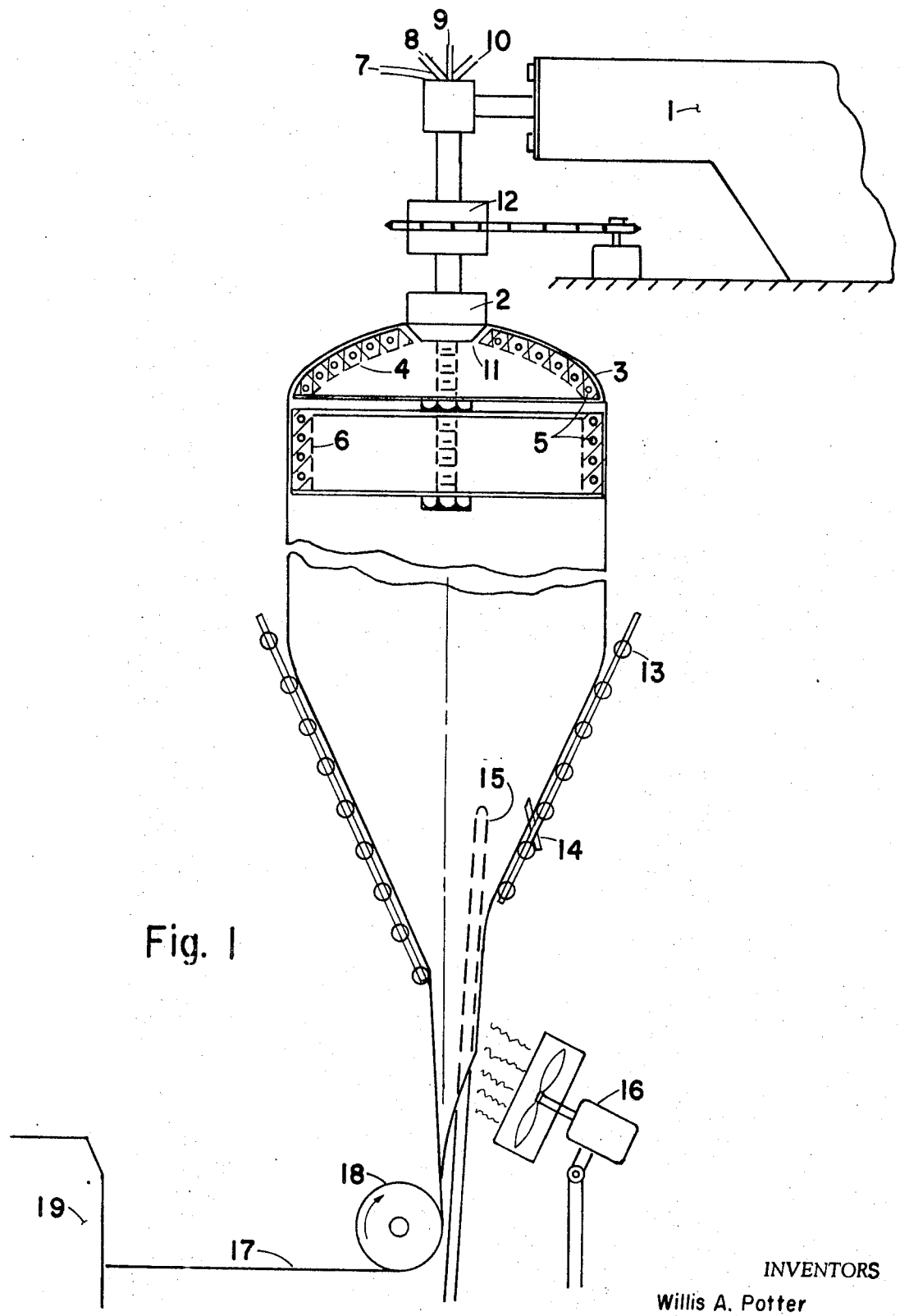
FIG. 1 is a schematic representation, partially in cross sectional elevation, showing the essential elements and combinations of one embodiment of the method and an apparatus for manufacturing film in accordance with the invention.

Supporting transfer lines vacuum 7, cooling fluid 8, air 9, and heating fluid 10, as shown in FIG. 1 can also be directed upward to mandrels 4 and 6 through the slit tube opening from below as well as by passing downward through the extruder head.

Figure 2:
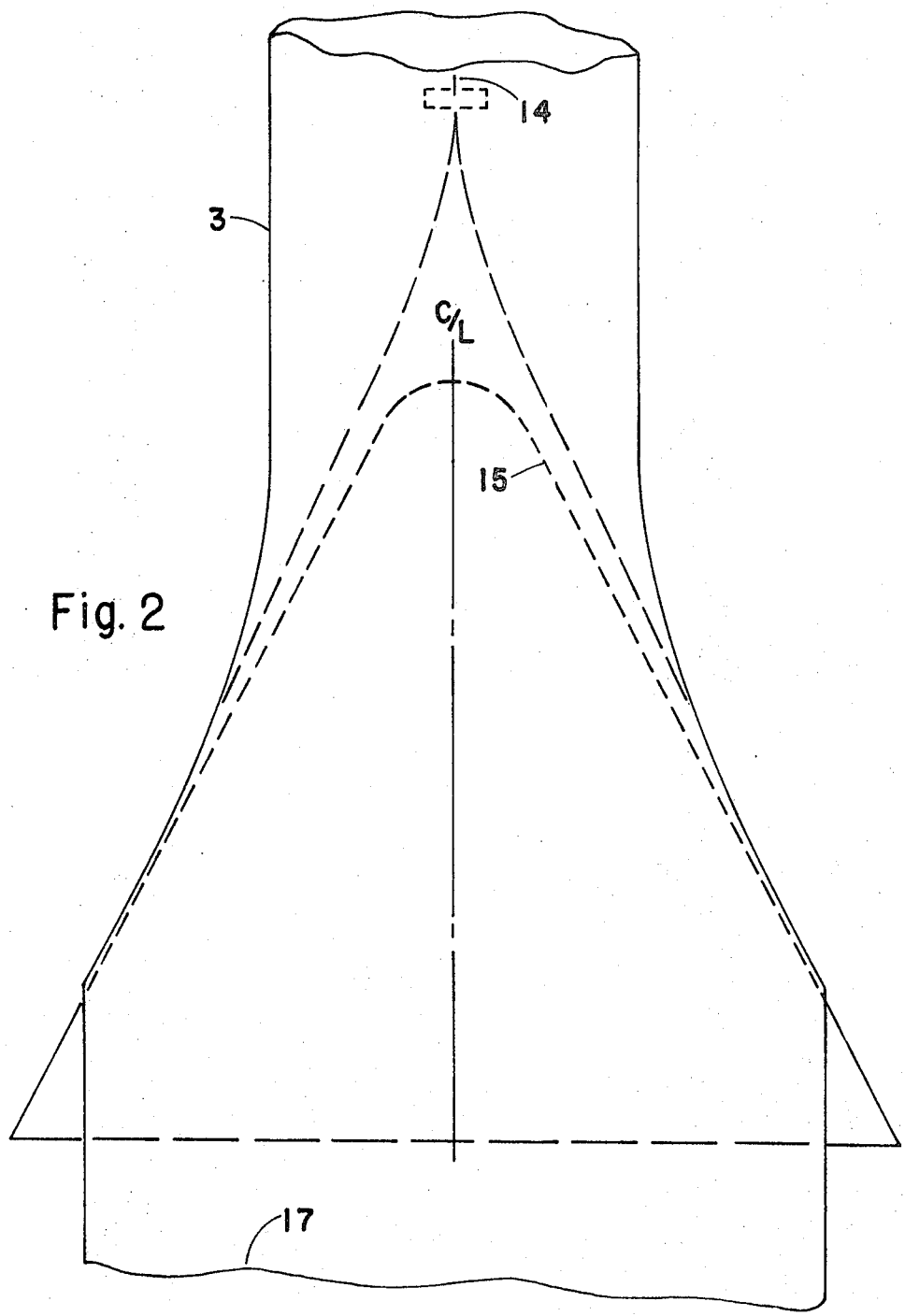
FIG. 2 is a fragmentary front view of the slitter and opener portions of the operations.

FIG. 2 shows the front view of the slitter 14 and wedge-shaped opener 15. This wedge-shaped opener 15 is positioned so that film tubing 3 must be flattened after it is cut open by slitter 14. Thus flat sheeting 17 is now ready to be rolled into rolls of flat sheeting.

DESCRIPTION OF PREFERRED EMBODIMENT

Molten polyethylene is extruded from the apparatus shown in FIG. 1 at a rate of 80 to 260 pounds per hour through a radial die 2 having an orifice opening of 0.020 to 0.040 inch and a diameter of 8 inches at a temperature of 300 to 600 degrees F. The extruded film tubing 3 is withdrawn in a vertical direction normal to the die face at a rate of 15 to 200 feet per minute. Mandrels 4 and 6 have a diameter of 19.1 inches producing tubing 3 having a wall film thickness of 0.001 to 0.008 inch and a tubing diameter of 19.1 inches or 60 inch wide sheeting 17. Heated mandrel 4 is kept at a temperature of 120 to 220 degrees F. by heating fluid through line 10. Sufficient air at opening 11 at a temperature of 40 to 100 degrees F. is supplied through air line 9 to support the freshly extruded film tubing away from heated mandrel 4 to prevent sticking. Cooled mandrel 6 is kept at a temperature of 34 to 90 degrees F. by cooling fluid through line 8. A vacuum pressure of 1 to 200 inches of water is applied internally to cooled porous mandrel 6 through line 7 to maintain intimate contact of film to cooled mandrel 6. Fan 16 directs 15 to 200 cubic feet per minute of air against tubing opener 15 into the opening created by the tubing slitter 14. The sheeting 17 then passes across idler roll 18 to winder 19 where it is rolled.

In addition to polyethylene, any thermoplastic material or mixtures of synthetic rubbers with thermoplastic materials may be used in this process and apparatus. The well known film forming polyolefins such as polyethylene and polypropylene are preferred but any film forming polymer can be used. See for example the polymers listed in column 10 of U.S. Pat. 2,720,680 to Gerow, and the list in column 6 of U.S. Pat. 2,987,765 to Cichelli.

The pressure of the air emitted from opening 11 in the heated mandrel 4 to support the thermoplastic film 3 during the formative mastic state is relatively small, less than 5 pounds per square inch gage pressure. Compressed air is supplied to the air line 9 from a suitable source of supply where it is maintained under a suitable pressure higher than that required, and then reduced and regulated by conventional pressure regulator to achieve the desired pressure.

Vacuum, heating fluid and cooling fluid are all supplied by conventional means.

The winder, idler roll, fan, extruder, collapser, tubing slitter, heat transfer coils and rotator are all conventional equipment available commercially or easily constructed by one skilled in the art. The radial die is known in the art and may be similar to that described in U.S. Pat. 3,212,134 to Yokana. The wedge-shaped tube opener can be fabricated out of any rigid material. The edges of the tube opener must be rounded so that it does not abrade the polymer film. The shoulder-shaped, heated mandrel can be fabricated from any rigid material which conducts heat well, such as steel or aluminum. The cooled, cylindrical mandrel must be fabricated from a rigid, porous, heat conducting material such as porous aluminum or bronze where it contacts the polymer film, such porous metals are used in the vacuum forming art and are commercially available.

The rate of extrusion, orifice opening, orifice diameter, tubing withdrawal rate, temperature and diameter of mandrels 4 and 6, vacuum pressure within mandrel 6, and volume of air directed by fan 16 are variables which must be balanced in order to produce tubing of the desired physical properties, cost, thickness and diameter from the particular thermoplastic material being extruded.

The properties and stabilities of the thermoplastic substances can be modified by incorporating materials such as plasticizers, fillers, coloring agents, heat decomposition inhibitors, antioxidants, and light stabilizers.

In the preferred embodiment the tubing is withdrawn in a direction vertical to the die face. Though this is a preferred embodiment, the principles of the invention can also be utilized for extruding at other angles.

In the preferred embodiment the tubing is only cooled internally. However, this invention can also be used in conjunction with external tubing cooling means.

In the preferred embodiment the heated mandrel is arcuate and shoulder-shaped. However, any shape is operable which transfers heat and maintains close proximity but remains out of contact with the freshly formed film tubing by permitting smooth flow of a thin layer of fluid.

What is claimed is:

1. The method of producing flat tubing and sheeting comprising consecutively
    (a) extruding molten thermoplastic resin tubing from a radial die
    (b) immediately passing the tubing in close proximity to, but out of contact with a heated mandrel
    (c) contacting the tubing with a cooled cylindrical porous mandrel by means of a vacuum applied internally to said cooled porous cylindrical mandrel thereby drawing said resin tubing inwardly toward said porous mandrel.

2. The method of claim 1 wherein the cooled tubing is then slit, flattened into a sheet, and air is blown into the slit tubing at the opening where it has been slit.

3. The method of claim 2 wherein the said heated mandrel is maintained at a temperature of about 120 to 220 degrees F., and the said cooled mandrel is maintained at a temperature of about 34 to 90 degrees F.

4. The method of claim 3 wherein the said tubing is held in close proximity to, but out of contact with said heated mandrel by means of air emitting from a circular orifice in said heated mandrel at said radial die, so that it flows across said heated mandrel said air maintained at a temperature of from about 40 to 100 degrees F.

5. The method of claim 4 wherein the said thermoplastic resin is polyethylene, extruded at a temperature of about 300 to 600 degrees F. at a rate of about 80 to 260 pounds per hour, a vacuum pressure of about 1 to 200 inches of water is maintained on said cooled mandrel, extruded tubing is withdrawn at a rate of about 15 to 200 feet per minute, and sufficient air is blown into said slit tubing at said opening to maintain a bubble within said tubing between said cooled mandrel and said opening.

References Cited

UNITED STATES PATENTS

| | | | |
|---|---|---|---|
| 2,358,376 | 9/1944 | Banigan et al. | 264—95 |
| 2,987,767 | 6/1961 | Berry et al. | 264—95 |
| 3,160,918 | 12/1964 | Berggren et al. | 18—14S |
| 3,213,165 | 10/1965 | Pollock | 264—95X |
| 3,327,030 | 6/1967 | Reifenhauser | 264—47 |
| 3,349,436 | 10/1967 | Vanden Bosch | 18—14T |
| 3,400,184 | 9/1968 | Ryota Matsuo et al. | 264—89 |

FOREIGN PATENTS

| | | | |
|---|---|---|---|
| 1,206,574 | 12/1965 | Germany | 18—143 |

ROBERT F. WHITE, Primary Examiner

J. H. SILBAUGH, Assistant Examiner

U.S. Cl. X.R.

18—14; 264—90, 95